United States Patent

Stadelmann et al.

Patent Number: 5,353,696
Date of Patent: Oct. 11, 1994

[54] CONCHING DEVICE

[75] Inventors: Max Stadelmann, Salmsach, Switzerland; Hans-Joachim König, Bad Salzuflen, Fed. Rep. of Germany

[73] Assignee: Bühler AG, Uzwil, Switzerland

[21] Appl. No.: 126,721

[22] Filed: Sep. 23, 1993

Related U.S. Application Data

[63] Continuation of Ser. No. 921,924, Jul. 29, 1992, abandoned.

[30] Foreign Application Priority Data

Aug. 2, 1991 [DE] Fed. Rep. of Germany ....... 4125629

[51] Int. Cl.5 .............. A23G 1/00; A23G 1/10; A23G 1/16; B01F 7/08
[52] U.S. Cl. .................. 99/472; 99/348; 99/485; 366/139; 366/291; 366/297; 366/301
[58] Field of Search .......... 99/472, 341, 348, 452–455, 99/460, 483, 484, 485, 516; 366/138, 154, 139, 155, 143, 347, 297–301, 83–86, 290, 291; 426/631, 519, 660, 557

[56] References Cited

U.S. PATENT DOCUMENTS

| | | | |
|---|---|---|---|
| 2,792,304 | 5/1957 | Pavan | 366/139 |
| 2,888,045 | 5/1959 | Reaves et al. | 366/143 |
| 2,992,813 | 7/1961 | Bonomo et al. | 366/139 |
| 3,314,383 | 4/1967 | Schlernitzauer | 366/139 |
| 3,634,106 | 1/1972 | Organ et al. | 99/485 |
| 3,663,231 | 5/1972 | Tourell | 99/485 |
| 3,682,086 | 8/1972 | Ocker | 99/485 |
| 3,901,482 | 8/1975 | Kieffaber | 366/301 |
| 3,992,985 | 11/1976 | McFarland | 366/139 |
| 4,679,498 | 7/1987 | Chaveron et al. | 99/483 |
| 5,083,506 | 1/1992 | Horn et al. | 366/297 |

FOREIGN PATENT DOCUMENTS

| | | | |
|---|---|---|---|
| 60034 | 3/1975 | Australia | 366/297 |
| 1209548 | 1/1966 | Fed. Rep. of Germany | |
| 3626732 | 2/1988 | Fed. Rep. of Germany | |
| 0673617 | 3/1990 | Switzerland | 366/301 |

Primary Examiner—Timothy F. Simone
Attorney, Agent, or Firm—Martin A. Farber

[57] ABSTRACT

In a conching device (1), a covering hood (7) is arranged above the opening (6) of the trough (2), which prevents the chocolate paste from being thrown out of the opening (6) during the conching process. The bottom side of the covering hood (7) is continuously cleaned by a wiper (15) by means of a periodic forward and backward movement. An electric motor (18) or a fluidic swivel drive (18) is used for driving the wiper.

24 Claims, 3 Drawing Sheets

CONCHING DEVICE

RELATED APPLICATION

This application is a continuation of our co-pending application Ser. No. 07/921,924 filed Jul. 29, 1992, now abandoned.

BACKGROUND OF THE INVENTION

The invention relates to a conching device for treating chocolate paste by kneading and mixing, comprising a trough wherein at least one rotor with refining tools rotates.

Conching devices may be designed as dry conching devices or as liquid conching devices. It is preferred to use conching devices that can be operated both as dry conching devices and liquid conching devices. With such a conching device as it has become known from DE-A 36 26 732, refining tools with refining blades extending at a slant angle to the trough wall are provided, which refining tools serve as scrapers or wipers for the dry treatment when the direction of rotation is reversed. The conching devices can have only one rotor in a trough compartment assigned to it, or else a plurality of rotors in trough compartments respectively assigned to them.

When a conching device is employed which, by changing the direction of rotation of the rotors, can be operated both as a dry conching device and as a liquid conching device, the chocolate paste will first assume a dry-pasty condition, whereupon it will turn into a viscous-plastic condition to finally change into a liquid condition. With such a conching of the chocolate paste by means of the mechanical action of the rotors, a heating and an aeration will be accomplished. When using this arrangement, for example a volatilization of organic acids, such as acetic acid, and also a desired oxidation of flavorings will result. Moreover, a mixing effect and a rounding off of the particles will be achieved.

The air required for the aeration reaches the chocolate paste through an opening in the upper wall of the trough. The evaporated substances escape from the trough out of this opening. Apart from this desired exchange through the opening of the trough, also chocolate paste is thrown out of the trough due to the mechanical action of the rotors. Since fine chocolate masses have to be conched up to 48 hours, they will often show completely different viscosities although being of identical recipe and exhibiting the same temperatures and comminution rates, which may result in some amount of chocolate paste being thrown out of the trough. The ensuing cleaning of the outer parts of the conching device then requires a great expenditure of time and energy. It is true that vertical plates are provided in the area of the trough opening, but these plates are unsatisfactory in most cases as they prevent the spurting of the chocolate paste only partially and also because they have a considerable soiling effect and have to be cleaned manually.

SUMMARY OF THE INVENTION

According to a first aspect, it is an object of the present invention to provide a conching device that prevents the chocolate paste from being thrown out of the trough during the conching process and facilitates the cleaning operations. This object is achieved by providing a covering hood above the trough with a cleaning installation for its bottom side, in such a manner that the covering hood covers the opening on the upper side of the trough at least partially in a closed state. It has become apparent that a hood covering the trough opening is advantageously shaped cylindrically, preferably being of a circular cylindrical form. This shape enables the application of a simple mechanical cleaning system which comprises a shaper unit engaging the bottom side or inner surface of the covering hood and rotating about the cylinder axis, as well as a drive unit for moving the scraper. Preferably, this drive is a reciprocating one as it has become known from DE-A-1 209 548, by way of example.

To control a reciprocating movement, it is convenient to provide limit switches on both sides of the lateral border area of the cylindrical hood unit, e.g. at least one read contact each. When passing a contact, the scraper is preferably caused to first reduce its speed and then to change its direction. The devices for speed reduction and change of direction are designed in a manner known per se according to the type of drive chosen.

If the wiper is driven by an electric motor, the speed-reduction device and the device for inversion of direction are designed in the form of electrical circuits. If a fluidic swivel drive is used for moving the wiper, the speed-reduction device controls a pressure reducer valve, and the device for inversion of direction controls the pilot valves of the swivel drive.

The bearing of the wiper will be simplified by providing an electric motor or a fluidic swivel drive as driving unit. When using such an arrangement, the surface of revolution of the covering hood need not be a circular cylinder since, with the aid of a cam drive (in a similar way as it has already been suggested for the windscreen wipers of motor vehicles), a cylindrical shape (in the most general sense) differing from this form can be achieved. Undoubtedly, the construction will be further simplified when using a circular cylinder, though.

In principle, it would be conceivable to have the cleaning device rotate about a rotational axis within the covering hood. However, this would call for a corresponding height of construction of the covering hood, all the more so since the cleaning device performs its function on the inner surface of the covering hood merely in the upper area of its motion. For this reason, it is preferred to design the covering hood, at least in part, as a cylindrically-shaped unit, in particular having a circular cylindrical shape, and by making the wiper pivotable about an axis whose center preferably coincides with that of the circular cylinder.

To enable a sufficient inflow of fresh air required for aerating the chocolate paste, at least one, but preferably two air passage openings are arranged within the covering hood. Since a volatilization of organic acids, such as acetic acid, and also a desired oxidation of flavorings will result during the conching process, it is of particular importance to effect an air circulation without causing a short circuit, so that the outgoing air produced is carried away after its development from the chamber delimited by the covering hood and completely replaced by fresh air in a short time. An embodiment according to the teachings of the invention provides a forced air conveyance with a least one blower for generating a low or an excess pressure. This forced conveyance is particularly efficient when the air supply and discharge openings are placed correctly.

The opening for the exhaust sir should not be located within the area stroken over by the wiper because then there would a risk of the chocolate paste being sucked in. Therefore, the air discharge opening will be advantageously arranged in the area of one of the two end surfaces in longitudinal direction or, if required, in one of the two lateral border areas of the covering hood. The air supply opening is to be located as far away from the air discharge opening as possible with respect to the circulatory motion. The optimum position of the air passage openings also depends on the respective flow rates of the in and outgoing air.

According to another aspect of the present invention, it has been found that the flavor can be very much improved by controlling the amount of air in contact with the chocolate paste. In this connection, a particular improvement of the flavor has been achieved in a conching device for treating chocolate paste by kneading and mixing it, comprising a trough enclosing a trough compartment wherein at least one rotor with refining tools rotates, and by providing a covering above the trough, as well as by providing the trough compartment with a suction opening for producing a low pressure, or vacuum, respectively. To attain this improvement, the upper wall need not be curved.

BRIEF DESCRIPTION OF THE DRAWINGS

Other characteristics of the invention will result from the description of a number of embodiments schematically shown in the drawings, in which.

DETAILED DESCRIPTION OF THE PREFERRED EMBODIMENT

Figure 1:
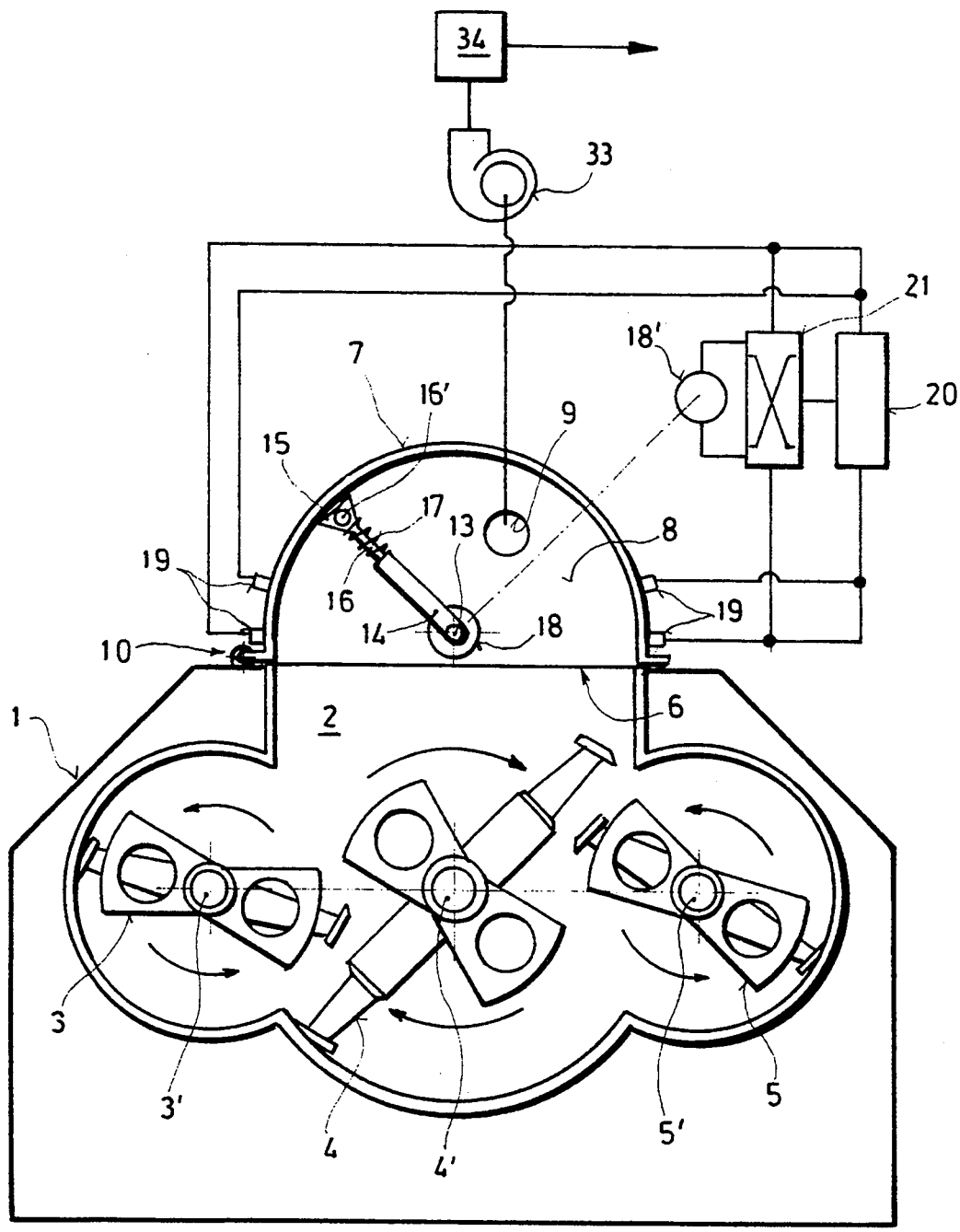
FIG. 1 shows a representation of a conching device and a scheme of a wiper control.

A conching device according to FIG. 1 comprises a trough 2 enclosing a trough compartment and rotors 3, 4, and 5, which are driven in a rotatory manner in respective trough departments by axes 3', 4', and 5'. Even though the embodiment shows a threeshaft conching device, any other number of rotors, such as one or two, would be conceivable as well. An opening 6 on the upper side of the trough 2 is covered preferably by a cylinder-segment-shaped covering hood 7, which is shut off in axial direction on both sides by end surfaces 8 preferably arranged at right angles to the axis.

In the end surfaces 8 and, if necessary, in the lateral border areas of the cylindrically-shaped surface of the hood 7, openings 9 are provided (only one of them is visible on this side of the covering hood), which serve to supply fresh air and discharge the vapors produced during the conching process. An embodiment in accordance with the teachings of the invention provides a suction device for discharging the vapors in the form of a blower 33, which, if required, may additionally comprise a cleaning installation 34, e.g. for the catalytic cleaning of the exhaust air leaving the treatment chamber which is enclosed by the conching device. It has become apparent that in Case of need a vacuum, or a low pressure, respectively, can be achieved within the trough compartment in this fashion, provided that the covering hood 7 fits in a relatively tight manner. Although the experts have always considered essential a sufficient air supply to conching devices, it has suprisingly become apparent that such a vacuum treatment may have a marked flavorenhancing effect within a conching device operating in principle without any heat supply during most of its operating time. Of course, this advantage will result even in a arrangement where no covering hood is provided, so that this embodiment is of independent inventive significance.

The hood 7 can be swinged open on its side by at least two hinges 10, by way of example, which connect one side of the hood 7 to the casing of the conching device 1 so that the opening 6 can be reached from above. A further opening device provided by the invention is composed of rolls 11 according to FIG. 2, of which rolls at least two in each case are attached to parallel-running outer surfaces of the hood 7, as well as of rail units in accordance with the rolls, which rail units are mounted on the trough border. The hood 7 can be displaced on the rails so far until a sufficiently large area of the opening 6 has been given free.

In the center of the cylinder segment, there is an axis 13 supporting the end surfaces 8 on both sides. At least two connecting rods radially project from the axis 13 to a wiper 15. The wiper is advantageously provided with a guide pin 16 and a holding down attachment adjoining it, e.g. a spring 17 on the radially outer end of the connecting rods 14, and pressed onto the lower surface of the hood 7. It is conveniently pivotally mounted about an axis 16' so that it can adapt to the upper surface of the hood 7, in particular when it is not exactly of a circulocylindrical form. When the wiper 15 passes, its two edges fitting closely to the hood 7, loosen the masses of chocolate paste adhering to the lower surface of the hood 7, which fall into the trough again after having been loosened.

A drive unit 18 with a motor 18' moves the wiper along the bottom side of the hood in both directions until the lateral border areas of this bottom side. To generate the reciprocating movement, at least one read contact 19 each, but preferably two such contacts 19 each a re provided in the area of the two lateral border areas, controlling the drive via a speed switching circuit 20 and a switching unit for reversal of rotation 21. Apart from the electric motor 18', also a fluidic swivel drive may be provided as a drive unit, as will be described later with reference to FIG. 3.

Figure 2:
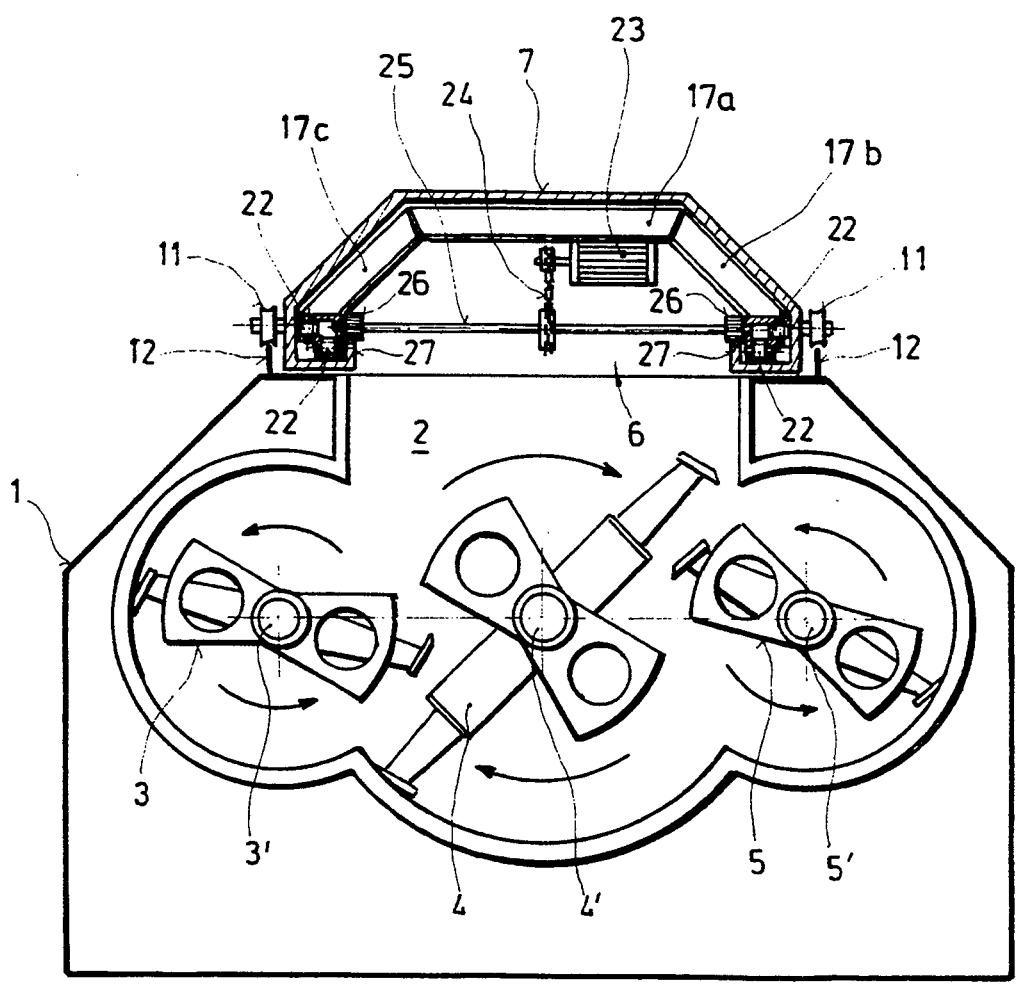
FIG. 2 illustrates a further embodiment of a conching device.

A further embodiment according to FIG. 2 provides a covering hood 7 comprising a uniform transverse section with preferably three straight sections running along a certain part of its longitudinal axis. The cleaning device is composed of a wiper carriage whose three wipers 17a, b, and c closely fit the bottom side of the hood 7. This wiper carriage is guided vertically and laterally by means of rolls 22 at three places at the least not lying on a straight line, but preferably at two places on both sides each — in the lateral border areas of the covering hood 7. The wiper carriage is moved backward and forward by an electric motor 23, and, if required, by a linear motor. Via a chain 24, the electric motor 23 drives a shaft 25 carried on both sides of the wiper carriage. Two toothed wheels 26 that are attached to the shaft 25 each engage a toothed rack 27 fixed on two parallel-running lower inner edges of the covering hood 7. In the two end regions of the covering hood in longitudinal direction, at least one, but preferably two limit contacts each are provided, serving to control the drive unit via a speed switching circuit and a switching unit for change of direction in such a manner that the wiper carriage performs a periodic reciprocating motion along the longitudinal direction of the covering hood 7.

Figure 3:
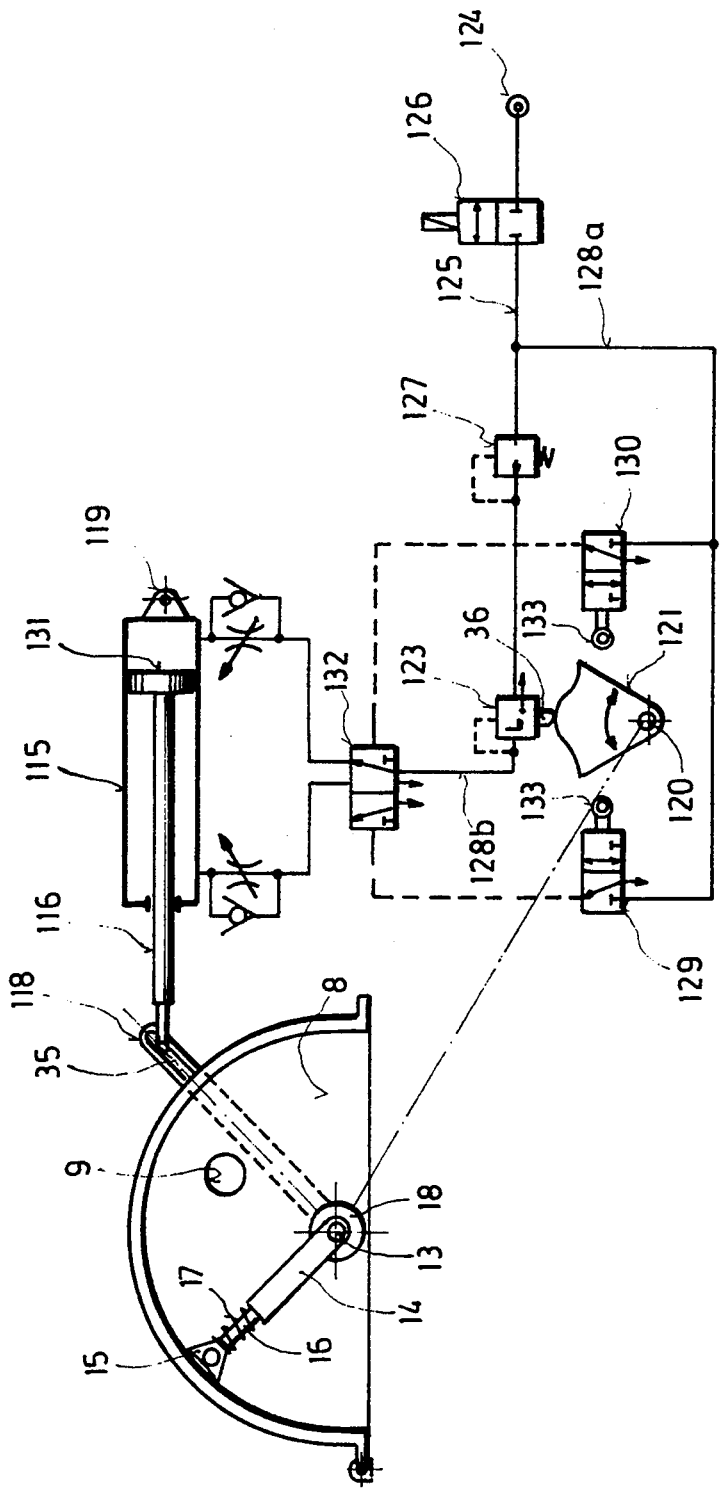
FIG. 3 represents a modification of the wiper drive shown in FIG. 1.

As shown in a modification of the driving unit according to FIG. 3, a piston-and-cylinder unit is provided as swivel drive drivable as such by means of any driving fluid. In principle, also a rotatory fluidic motor may be used, yet the fluidic drive shown above suits better for this purpose. With such a piston-and-cylinder unit, relatively large regulating distances in conjunction with relatively great forces can be achieved. To compensate the difference angles resulting in the case of the swivel motion, the cylinder of the swivel drive 115 may be designed as pivoting about a vertical axis 119, yet it may suffice to provide an elongated slot in a driving lever tightly connected to shaft 18.

Due to the circular path of the wiper 15, in the case of a change of movement at the ends of the path, speed irregularities will result in accordance with a sine curve. In the case of small swivel angles, these divergences from linearity can be neglected. However, it is preferred to linearize the swivel drive. For this purpose, a cam plate 121 may be provided which pivots together with the wiper 15, and which cooperates with a cam follower 36 in order to actuate a pilot valve 123. The form of the cam plate 121 is designed in such a manner that the irregularities brought about by the swivel motion will be compensated for, that is to say that the movement of the wiper 15 will be somewhat accelerated in the border regions and somewhat slowed down in the mid-zones by increasing the cross-sectional area of the above-mentioned pilot valve 123 for an acceleration of the motion, or by reducing its cross-sectional area for slowing down the motion.

According to FIG. 3, the piston-and-cylinder unit 115 is powered (hydraulically or pneumatically) by a source of pressure 124. In a supply line 125, a relay valve 126 is provided for switching the device on or off. The supply line 125 ramifies into a switching circuit 128a and a control circuit 128b. A pressure reducing valve comes first in the driving circuit 128b. Then, still in the driving circuit 128b, follows the pilot valve 123 whose cross section of passage is adjusted, as previously described, by the cam plate 121 in dependence upon the swiveling position of the wiper 115. The piston of the piston-and-cylinder unit 15 may be biased by pressure via a main valve from one side or the other, as generally known. The main valve controls the reversal of motion and is regulated with the help of pilot valves 129 and 130, which, by switching over main valve 132, initiate the reversal of motion of piston rod 116. Thereby, the main valve 132 is advantageously designed as bistable.

The pilot valves 129 and 130 have notches 133 which are actuated in the respective limit positions of the cam plate 121, whereby the main valve 132 is switched over hydraulically or pneumatically into one or other stable switch position. The dynamic behavior of the piston rod 116 between the two changeover points for reversal of motion is determined solely by the pilot valve 123, or whose cross section of passage, respectively, which is controlled by the shape of the cam plate.

The change-over of the main valve for initiating the reversal of motion may also take place by electromechanical means. In such a case, the pilot valves 129 and 130 would have to be replaced by corresponding switching devices, such as limit switches, or the like (in accordance with the limit switches 19).

It is to be understood that within the scope of the invention numerous modifications will be possible; for example, instead of wipers, rotating cleaning elements outfitted with brushlike flaps, fins or tongues striking over the inner surface may be provided.

What is claimed is:

1. A conching machine for treating chocolate paste by kneading and mixing comprising
   wall means surrounding a treatment chamber and forming a trough for containing said chocolate paste, said
   trough having at least two compartments parallel to each other, and
   an upper wall disposed above said trough and having an opening;
   a covering hood for covering at least a portion of said opening, said hood having an outer and inner surface as well as a lower edge to join said upper wall;
   at least two rotors within said trough, each one of the said rotors having
   an axis of rotation,
   a shaft extending along said axis of rotation, and kneading elements radially projecting from said shaft,
   each rotor being located within one of said compartments;
   motor means for driving said rotors; and
   cleaning means for cleaning said inner surface of said hood.

2. Conching machine as claimed in claim 1, wherein said cleaning means comprise scraper means for engagement with said inner surface of said hood, and actuating means for moving said scraper means over said inner surface.

3. Conching machine as claimed in claim 1, wherein said cleaning means comprise a movable cleaner means and actuating means including drive means for imparting movement to said movable cleaner means.

4. Conching machine as claimed in claim 3, wherein said drive means comprise an electric motor.

5. Conching machine as claimed in claim 3, wherein said drive means comprise a fluidic drive.

6. Conching machine as claimed in claim 3, wherein said drive means comprise a swivel drive.

7. Conching machine as claimed in claim 6, wherein said swivel drive is a fluidic swivel drive and comprises at least one piston-and-cylinder unit and means for controlling admission of fluid to said unit.

8. Conching machine as claimed in claim 6, wherein said swivel drive comprise
   prime mover means, and
   switch over means for switching a driving direction of said prime mover means.

9. Conching machine as claimed in claim 8, wherein said switch over means comprise at least two limit switch means, each one being arranged at an end of the path of a part moving together with said movable cleaner means.

10. Conching machine as claimed in claim 9, wherein each of said limit switch means are arranged within a region of said lower edge of said covering hood.

11. Conching machine as claimed in claim 9, wherein each of said limit switch means comprise first and second limit switches, the first limit switch being arranged at the end of the path of said movable cleaner means, while the second limit switch is situated a predetermined stroke before the end, said swivel drive means comprising speed reducing means, said second limit switch controlling said speed reducing means for limiting and reducing the speed of said movable cleaner means before reaching the end of said path.

12. Conching machine as claimed in claim 2, wherein said covering hood is, at least partially, of a cylindrical shape, thus defining a geometrical axis.

13. Conching machine as claimed in claim 12, wherein said cylindrical shape is circular cylindrical.

14. Conching machine as claimed in claim 13, wherein said scraper means are pivotally mounted about a pivoting axis, said pivoting axis coinciding with said geometrical axis.

15. Conching machine as claimed in claim 1, wherein said covering hood has at least one air passage opening.

16. Conching machine as claimed in claim 15, wherein said covering hood has at least two air passage openings.

17. Conching machine as claimed in claim 16, further comprising air circulation means for providing an air supply to said trough, said air circulation means being connected to at least one of said air passage openings.

18. Conching machine as claimed in claim 17, wherein said air circulation means comprise driven ventilation means.

19. Conching machine as claimed in claim 17, wherein said air circulation means comprise air cleaning means for cleaning outgoing air drawn off said treatment chamber.

20. Conching machine as claimed in claim 1, wherein said covering hood is movable from a covering position into an open position for exposing most of said opening.

21. Conching machine as claimed in claim 20, further comprising guide means for guiding said covering hood upon movement from one position to the other.

22. Conching machine as claimed in claim 21, wherein said guide means comprise hinge means connected to said lower edge of said covering hood means and said upper wall to enable opening and closing of said hood means.

23. Conching machine as claimed in claim 21, wherein said guide means comprise rail means and roller means rolling along said rail means, one of said rail and roller means being connected to said covering hood means, the other one being connected to said upper wall means.

24. A conching machine for treating chocolate paste by kneading and mixing comprising
   wall means surrounding a treatment chamber and forming a trough for containing said chocolate paste, said trough having at least two compartments parallel to each other, and
   upper wall means disposed above said trough for closing said treatment chamber, said upper wall means including an end wall and having at least one opening disposed in said end wall;
   at least two rotors within said trough, each one of said rotors having
   an axis of rotation,
   a shaft extending along said axis of rotation, and
   kneading elements radially projecting from said shaft,
   each rotor being located within one of said compartments;
   motor means for driving said rotors; and
   suction means connecting with said one opening for providing under pressure within said treatment chamber for removal of volatile emissions from the chocolate paste;
   wherein said at least one opening in said end wall is positioned at a location within said treatment chamber and distant from said kneading elements to avoid contact with said chocolate paste.

* * * * *